United States Patent
Swaminathan et al.

(10) Patent No.: US 9,223,804 B2
(45) Date of Patent: Dec. 29, 2015

(54) DETERMINING CAPACITY OF SEARCH STRUCTURES

(71) Applicant: QUALCOMM Incorporated, San Diego, CA (US)

(72) Inventors: Ashwin Swaminathan, San Diego, CA (US); Raghuraman Krishnamoorthi, San Diego, CA (US); Serafin Diaz Spindola, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 13/802,082

(22) Filed: Mar. 13, 2013

(65) Prior Publication Data

US 2014/0059037 A1    Feb. 27, 2014

Related U.S. Application Data

(60) Provisional application No. 61/693,699, filed on Aug. 27, 2012.

(51) Int. Cl.
*G06F 17/00* (2006.01)
*G06F 17/30* (2006.01)

(52) U.S. Cl.
CPC ...... *G06F 17/3028* (2013.01); *G06F 17/30247* (2013.01); *G06F 17/30271* (2013.01); *G06F 17/30961* (2013.01)

(58) Field of Classification Search
CPC . G06F 17/18; G06F 11/008; G06F 17/30749; G06F 17/30817; G06F 11/076; G06F 17/30035; G06F 17/30247

USPC ......................................................... 707/723
See application file for complete search history.

(56) References Cited

U.S. PATENT DOCUMENTS

| | | | |
|---|---|---|---|
| 7,672,976 B2 | 3/2010 | Tobin et al. | |
| 2008/0192129 A1 | 8/2008 | Walker et al. | |
| 2009/0067726 A1 | 3/2009 | Erol et al. | |
| 2010/0332475 A1* | 12/2010 | Birdwell et al. | 707/737 |
| 2011/0164826 A1 | 7/2011 | Noguchi et al. | |
| 2011/0200105 A1* | 8/2011 | Takamura et al. | 375/240.14 |
| 2012/0084305 A1 | 4/2012 | Inoue et al. | |

OTHER PUBLICATIONS

Adamek, T., et al., "Large-scale visual search based on voting in reduced pose space with application to mobile search and video collections", Multimedia and Expo (ICME), 2011 IEEE International Conference on, IEEE, Jul. 11, 2011, pp. 1-4, XP031964778, DOI: 10.1109/ICME.2011.6012100 ISBN: 978-1-61284-348-3 the whole document.

(Continued)

*Primary Examiner* — Truong Vo
(74) *Attorney, Agent, or Firm* — Silicon Valley Patent Group LLP

(57) ABSTRACT

A system for storing target images for object recognition predicts a querying performance for the target image if the target image were included in a search tree of a database. The search tree has a universal search tree structure that is fixed so that it does not change with the addition of new target images. The target image is selected for inclusion or exclusion in the search tree based on the based on the querying performance, wherein the fixed tree structure of the search tree does not change if inclusion of the target image is selected.

27 Claims, 12 Drawing Sheets

(56) References Cited

OTHER PUBLICATIONS

Baheti P.K., et al., "Information-theoretic database building and querying for mobile augmented reality applications", Mixed and Augmented Reality (ISMAR), 2011 10TH IEEE International Symposium on, IEEE, Oct. 26, 2011 pp. 47-53, XP032201434, DOI: 10.1109/ISMAR.2011.6092369 ISBN: 978-1-4577-2183- the whole document.

Grujic N., et al., "3D facial pose estimation by image retrieval", Sep. 17, 2008, 8th IEEE International Conference on Automatic Face & Gesture Recognition, FG '08, Sep. 17-19, 2008, IEEE, Piscataway, NJ, USA, p. 1-8, XP031448455, ISBN: 978-1-4244-2153-4 the whole document.

International Search Report and Written Opinion—PCT/US2013/056515—ISA/EPO—Oct. 25, 2013.

Nister et al., "Scalable Recognition with a Vocabulary Tree," 2006 IEEE Computer Society Conference on Computer Vision and Pattern Recognition, 8 pp.

Balasubramanian, et al., "Predicting Query Performance on the Web," SIGIR'10, Jul. 19-23, 2010, Geneva, Switzerland, pp. 1-2.

Boshra, et al., "Predicting Performance of Object Recognition," IEEE Transactions on Pattern Analysis and Machine Intelligence, Vol. 22, No. 9, Sep. 2000, pp. 956-969.

Cronen-Townsend, et al., "Predicting Query Performance," SIGIR'02, Aug. 11-15, 2002, pp. 1-2.

\* cited by examiner

DETERMINING CAPACITY OF SEARCH STRUCTURES

CROSS-REFERENCE TO RELATED APPLICATION(S)

This application claims priority under 35 USC 119 to U.S. Provisional Application No. 61/693,699, filed Aug. 27, 2012, entitled "Determining Capacity Of Search Structures" which is assigned to the assignee hereof and which is incorporated herein by reference.

BACKGROUND

1. Background Field

Embodiments of the subject matter described herein are related generally to adding target images to search trees stored in a database, and more specifically for determining whether a new target image should be added to the search tree.

2. Relevant Background

Object recognition typically uses an object database that is searched based on an image of the object. Typically, the object database has a search tree structure, such as the well-known k-d trees, HK means tree, and vocabulary trees. A useful object database should include many searchable objects and, thus, object databases tend to be large. Moreover, new objects may be added to object databases automatically, which typically requires a re-balancing of the search tree, i.e., the tree structure of the search tree is changed based on the newly included object. Re-balancing the search tree is a resource intensive operation. However, if the new object is not good for object recognition or if the performance of the object database deteriorates with the inclusion of the new object, then the addition of the new object to the search tree is undesirable. Thus, it is desirable to determine how the performance of the object database will be affected by the inclusion of a new object before that object is added to the database to avoid unnecessarily re-balancing the search tree.

SUMMARY

A system for storing target images for object recognition predicts a querying performance for the target image if the target image were included in a search tree of a database. The search tree has a universal search tree structure, which is a fixed structure so that it does not change with the addition of new target images. The target image is selected for inclusion or exclusion in the search tree based on the querying performance, wherein the fixed tree structure of the search tree does not change if inclusion of the target image is selected.

In one implementation, a method includes receiving a target image for inclusion in a database with a search tree; predicting a querying performance for the target image if the target image were included in the search tree of the database, wherein the search tree has a fixed tree structure that does not change when adding new target images; and selecting one of inclusion of the target image in the search tree of the database and rejection of the target image from the search tree of the database based on the querying performance, wherein the fixed tree structure of the search tree does not change if the inclusion of the target image is selected.

In one implementation, an apparatus includes an interface for receiving a target image for inclusion in a database with a search tree; and a processor coupled to the interface for receiving the target image, the processor configured to receive the target image, predict a querying performance for the target image if the target image were included in the search tree of the database, wherein the search tree has a fixed tree structure that does not change when adding new target images, and select one of inclusion of the target image in the search tree of the database and rejection of the target image from the search tree of the database based on the querying performance.

In one implementation, an apparatus includes means for receiving a target image for inclusion in a database with a search tree; means for predicting a querying performance for the target image if the target image were included in the search tree of the database, wherein the search tree has a fixed tree structure that does not change when adding new target images; and means for selecting one of inclusion of the target image in the search tree of the database and rejection of the target image from the search tree of the database based on the querying performance, wherein the fixed tree structure of the search tree does not change if the inclusion of the target image is selected.

In one implementation, a storage medium including program code stored thereon includes program code to receive a target image for inclusion in a database with a search tree; program code to predict a querying performance for the target image if the target image were included in the search tree of the database, wherein the search tree has a fixed tree structure that does not change when adding new target images; and program code to select one of inclusion of the target image in the search tree of the database and rejection of the target image from the search tree of the database based on the querying performance, wherein the fixed tree structure of the search tree does not change if the inclusion of the target image is selected.

DETAILED DESCRIPTION

Figure 1:
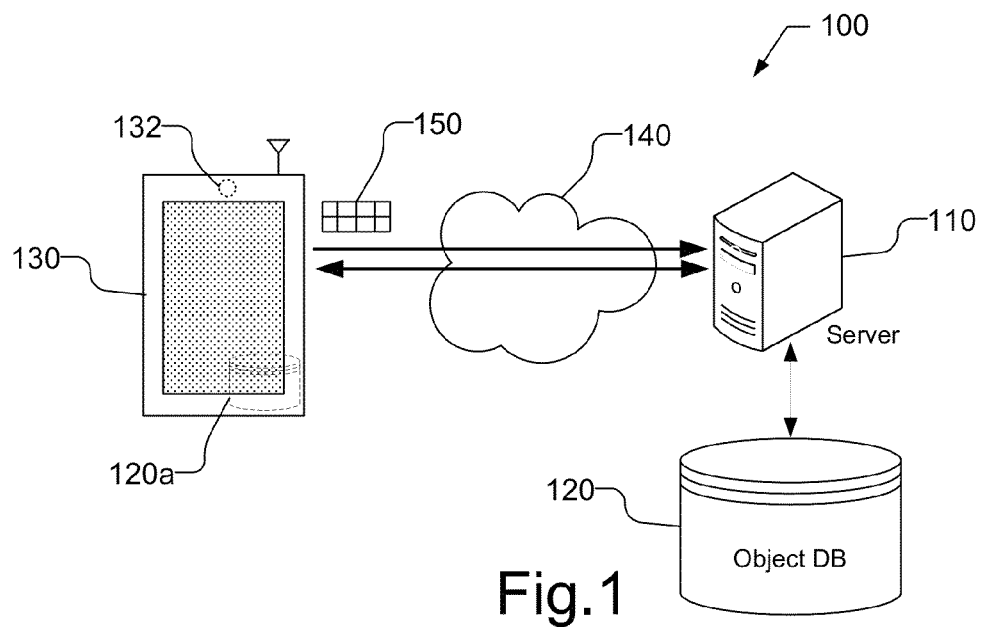
FIG. 1 is a block diagram illustrating a system 1 for storing target images to be used for object recognition by mobile devices.

FIG. 1 is a block diagram illustrating a system 100 for storing target images to be used for object recognition, e.g., by a mobile device 130. The system 100 includes a server 110 coupled to an object database 120 that stores target images in a search tree. The object database 120 may store a target image as a set of features extracted from the target images or, if desired, may store the entire target image. As illustrated in FIG. 1, an object database 120a may also or alternatively reside within the mobile device 130 in device memory or SD card. The benefit of adding a new object to the search tree stored in the database is determined prior to adding a new object into the search tree. To a large extent, the capacity of a search tree depends on the objects that are already stored in the search tree and, thus, the system predicts the performance of an object to be added to the search tree for object recognition before the object is added to the search tree. The predicted performance of the object if added to the search tree may be used to identify whether the object is to be added to the search tree or handled by other means, such as added to a different search tree or rejected.

During object recognition, a mobile device 130 may capture an image using a camera 132 and transmit acquired image data, such as the captured image or features extracted from the image, to the server 110 via a network 140. The network 140 may be any wireless communication networks such as a wireless wide area network (WWAN), a wireless local area network (WLAN), a wireless personal area network (WPAN), and so on. The server 110 may process the image data provided by the mobile device 130 and in response generate information, e.g., from the object database 120, that is related to the image data. For example, the server 110 may perform object detection and identification based on provided image data using the object database 120. The server 110 may then return to the mobile device 130 the information that is related to the acquired image data. For example, the server 110 may identify the object from the image data and provide a target image or features to the mobile device 130 for tracking purposes. When an object database 120a resides within the mobile device 130, the object recognition may be performed without use of the server 110.

As is well known, an effective approach for object recognition relies on extracting features from a query object, e.g., the image captured using camera 132, and comparing the extracted features to features stored in a database. Features are commonly extracted using techniques such as FAST (Features from Accelerated Segment Test), SIFT (Scale Invariant Feature Transform), and SURF (Speeded-up Robust Features). Features stored in a database are matched with features in the query object using search structures that provide an approximate nearest neighbor at a rate that is very efficient compared to an exhaustive search. Examples of search structures include the well-known k-d trees, HK means trees, and vocabulary trees.

Figure 2:
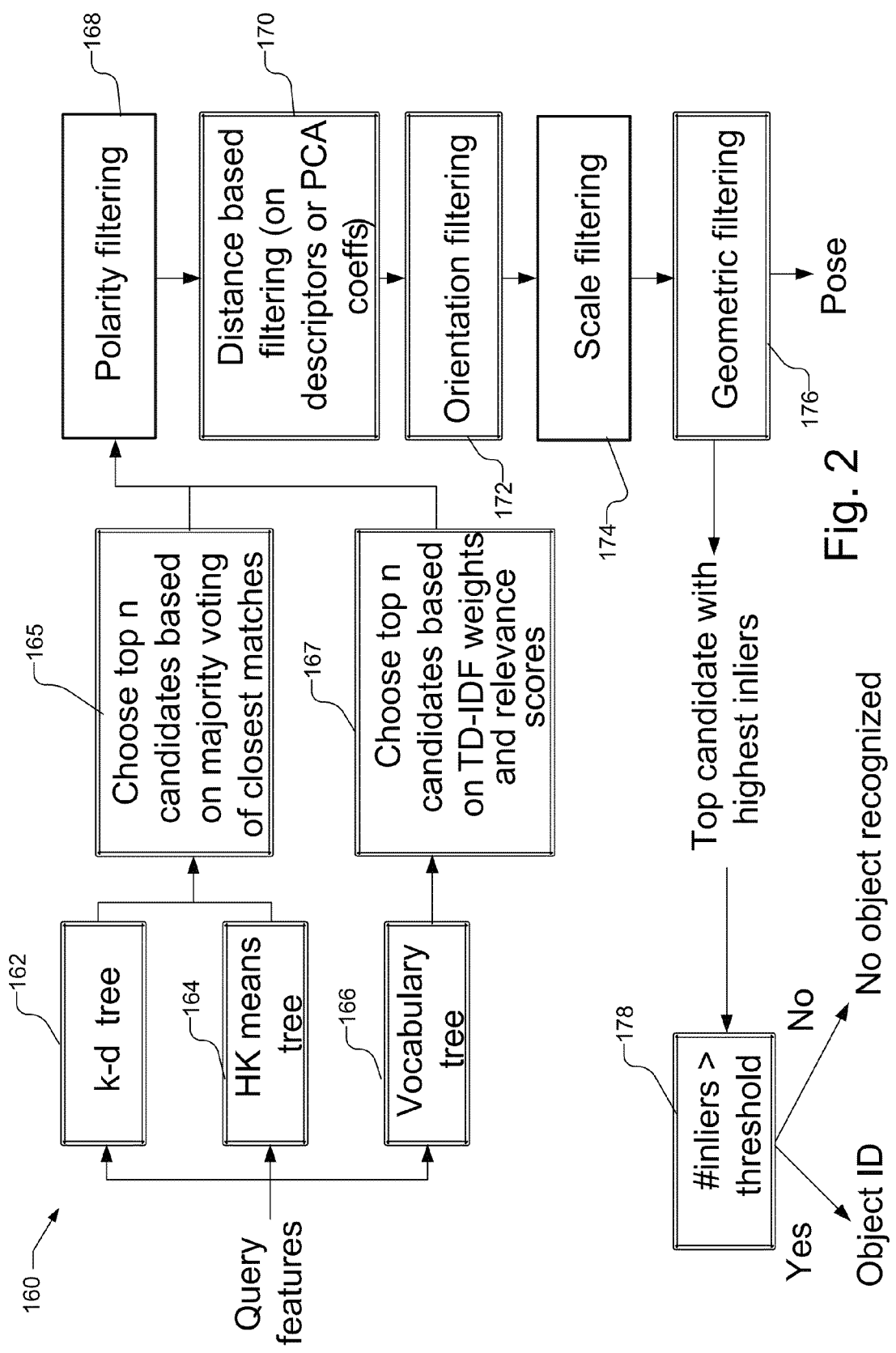
FIG. 2 illustrates an end-to-end matching pipeline that may be used by the server to match query features to an object stored in the object database.

FIG. 2, by way of example, illustrates an end-to-end matching pipeline 160 that may be used by the server 110 (or mobile device 130) to match query features to an object stored in the object database 120 (or object database 120a) using a search tree, such as k-d tree 162, HK means tree 164, and vocabulary tree 166. As illustrated, query features are presented to the one or more search trees. The query features may be features extracted from a query image, e.g., captured by camera 132, using, e.g., FAST, SIFT, or SURF. By way of example, if k-d tree 162 or HK means tree 164 is used, the top n (e.g., n=3) candidates may be chosen, e.g., based on majority voting of closest matches 165, and if a vocabulary tree 166 is used, the top n candidates may be chosen based on TF-IDF weights and relevance scores 167. The correspondences obtained from the search tree may be filtered, e.g., using polarity filtering 168 and distance based filtering 170. In cases where the full descriptors are stored, the descriptors may be used for the distance based filtering 170. In other cases, when full descriptors are not stored, distance based filtering 170 may be performed using the reduced dimensional descriptors if available. Dimensionality reduction techniques such as Principal Component Analysis (PCA) may be used to obtain the low dimensional descriptors from the full length vectors. By way of example, the 128-dimensional SIFT or SURF features may be reduced to a 5-dimensional vector using PCA and the distance based filtering 170 may be performed using the PCA coefficients. Orientation filtering 172, scale filtering 174, and geometric filtering 176 may also be performed to produce the top candidate with the highest inliers. If the number of inliers is greater than a threshold 178, the object is considered to be identified and if not, the object is considered not recognized. The geometric filtering may also provide an estimate of the relative pose between the query image and the top candidate image in the database.

As illustrated in FIG. 1, a target image 150 may be provided to the server 110 to be added to the object database 120, e.g., via network 140 or through another interface. It should be understood that the target image 150 may be added to the local object database 120a in mobile device 130 without the use of server 110, but for the sake of simplicity, adding a target image to an object database will be generally described herein as using server 110 and object database 120. While adding objects to the object database 120 is desirable in order to produce an inclusive database, it has been recognized that the performance of object detection algorithms degrade as the size of the object database 120 increases. In other words, a large database includes a larger number of objects, and thus, there is a larger set of objects that a query is to be compared against. Accordingly, it is desirable for the server 110 to identify when the addition of a target image 150 will decrease the performance of the object database 120 prior to adding the target image 150 to the object database 120. Moreover, the size of the object database 120 may be very large, particularly for a search tree to handle, and objects may be dynamically added and removed from the object database 120. Thus, it may be desirable for that the system work without user intervention.

Additionally, it is recognized that object recognition performance is highly dependent on the nature of the images in the object database. In other words, images with good texture have a higher chance of being recognized compared to images with poor texture, e.g., images with few corners and plain backgrounds do not perform as well as images with many corners. Thus, it may be desirable to identify whether the target image 150 should be considered a valid target image, i.e., with sufficient texture to have good recognition performance if it were added to the object database 120. Images that are classified as invalid target image are not stored in the object database 120. Additionally, invalid target images may not be transmitted from the mobile device 130 to the server 110, e.g., in scenarios when the object database 120 is not managed on the mobile device 130 and when the bandwidth of the network 140 is limiting factor.

Moreover, it is recognized that object recognition performance is also highly dependent on the search tree structure of the object database. For example, naïve approaches for searching, such as a linear search, are not efficient and do not scale well. General well known search structures, such as k-d trees, HK means tree, and vocabulary trees, are designed to facilitate faster and scalable searches. Typically, when adding a new image to an object database, one of two things can happen: (1) the search tree structure can be expanded to maintain the number of entries in the leaf nodes at a pre-designated threshold value, or (2) the search tree structure can remain the same while increasing the number of entries in certain leaf nodes. While the former approach restricts the number of entries in the leaf node, it is generally not feasible in computationally constrained environments, such as with mobile phones, especially in scenarios where the object database dynamically changing (with multiple additions and deletions). The latter approach maintains the search tree structure and therefore has a constant database update time. The latter approach, however, may increase the querying time because the elements in the leaf node need to be matched via a linear search. In the following, the latter approach is sometimes referred as a "universal" tree approach, which is defined as having a fixed tree structure that does not change with the addition or deletion of new target images. By way of comparison, conventional search trees as described in the former approach are re-balanced with the deletion and addition of each object and therefore the tree structure may dynamically changes with the addition of a new object. Additionally, the universal tree structure may be created using a separate database which may be different from the database which is used for search and retrieval.

Factors that affect the object recognition performance include the search tree structure and the database that was used to construct the tree, as well as the objects that are in the search tree and the number of objects. Once the object is identified, the pose can be estimated based on the matching correspondences obtained. Thus, the search tree structure significantly influences the performance of the object detection system both in terms of detecting the right object in the database and in terms of estimating the relative pose between the query image and the reference image in the database.

By means of an example, consider a universal tree with 10 branches and 5 levels built over a database of 700 CV cover targets with 1368784 descriptors. To evaluate the performance of this tree structure, consider an image database of 100 to 700 frontal images of CD covers. A training set contains around 2000 descriptors per CD cover image. A test set was generated using 25 different modified versions per target by artificially transforming the frontal CD cover image under different Pitch (0-80 degrees in steps of 10), scale (1.5×, 2×, 4×, 6×, 8×, 10×, and 12×) and yaw (0-80 degrees in steps of 10). The performance of the search tree was quantified as the number of objects increases in terms of precision, recall, and F-score as defined below.

$$Precision = \frac{No.CorrectDecisions}{Total\ No.ofDecisions} \qquad eq.\ 1$$

$$Recall = \frac{No.CorrectDecisions}{Total\ No.ofQueries} \qquad eq.\ 2$$

$$F-Score = \frac{2 \times Precision \times Recall}{Precision + Recall} \qquad eq.\ 3$$

Precision is a ratio of the number of correct decisions with respect to the total number of decisions, recall is a ratio of the number of correct decisions with respect to the total number of queries; and the F-score is a combination of the precision and recall scores. Ideally, a good search structure and system should produce both high precision and high recall scores, or equivalently, a high F-score. However, most often, a tradeoff exists between precision and recall, such that a high precision can be achieved at the cost of slightly lower recall. For augmented reality type applications, it is desirable to have a precision as close to 100% as possible and a recall as high as possible.

FIGS. 3A-3D illustrate in graphical form the recall and precision metric results for recognition and pose estimation for a universal tree with 10 branches and 5 levels and 4 levels, as identified in each graph. Recognition results indicate the performance of the tree in retrieving the top object from the database averaged over the set of query images; note that recognition results indicate the relative performance of the algorithm for image retrieval applications where there is no need to explicitly estimate the pose of the query image with respect to the database image. For other applications, such as in augmented reality, it is not only important to retrieve the top object from the database for a given query image, but also estimate the pose of the query image with respect to the database image and the performance of this tree for such tasks is shown marked as "Pose estimation" results or PE in short.

Figure 3A:
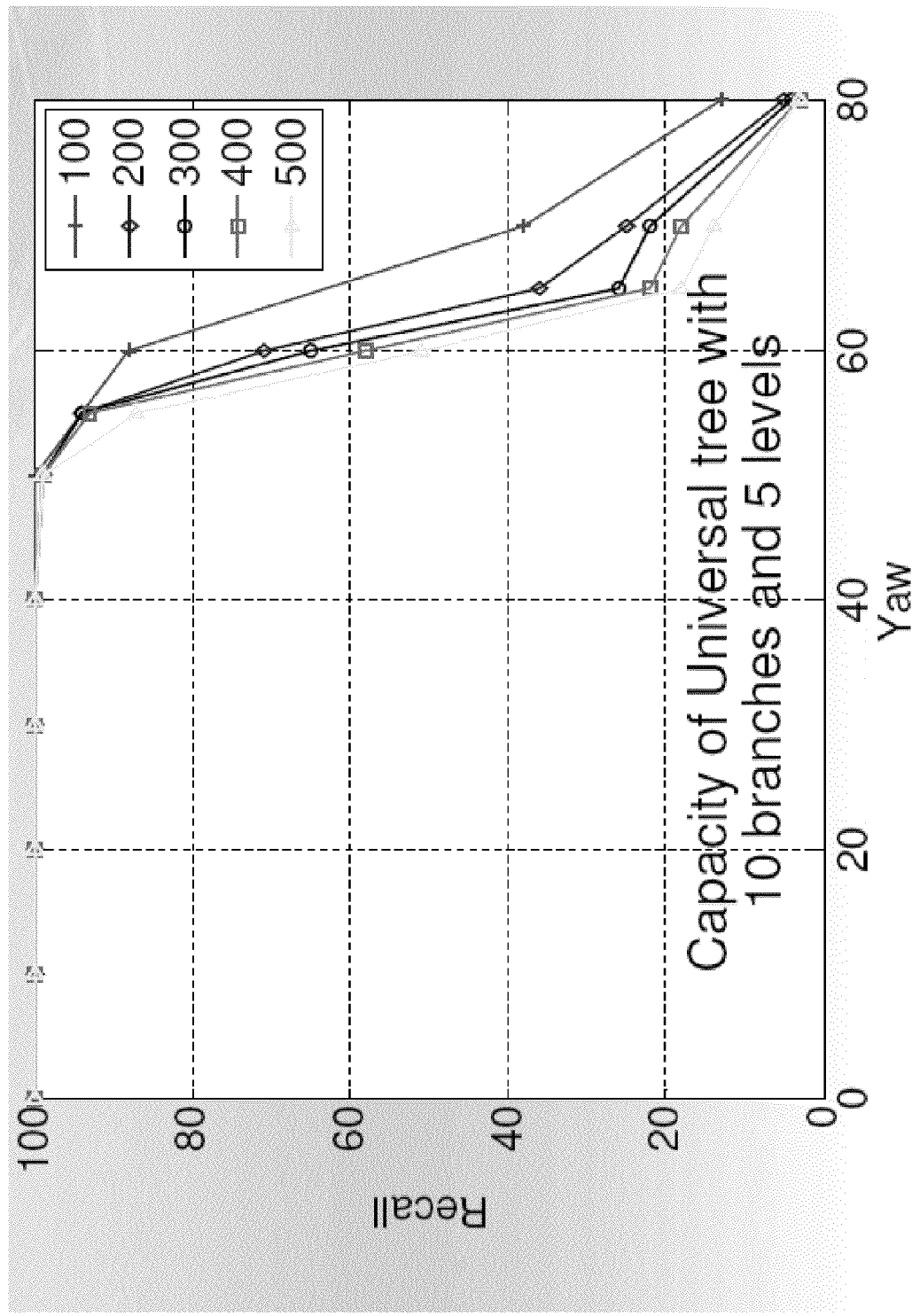
FIGS. 3A-3D illustrate in graphical form the metric results for recognition and pose estimation for recall and precision for a universal tree.
Figure 3B:
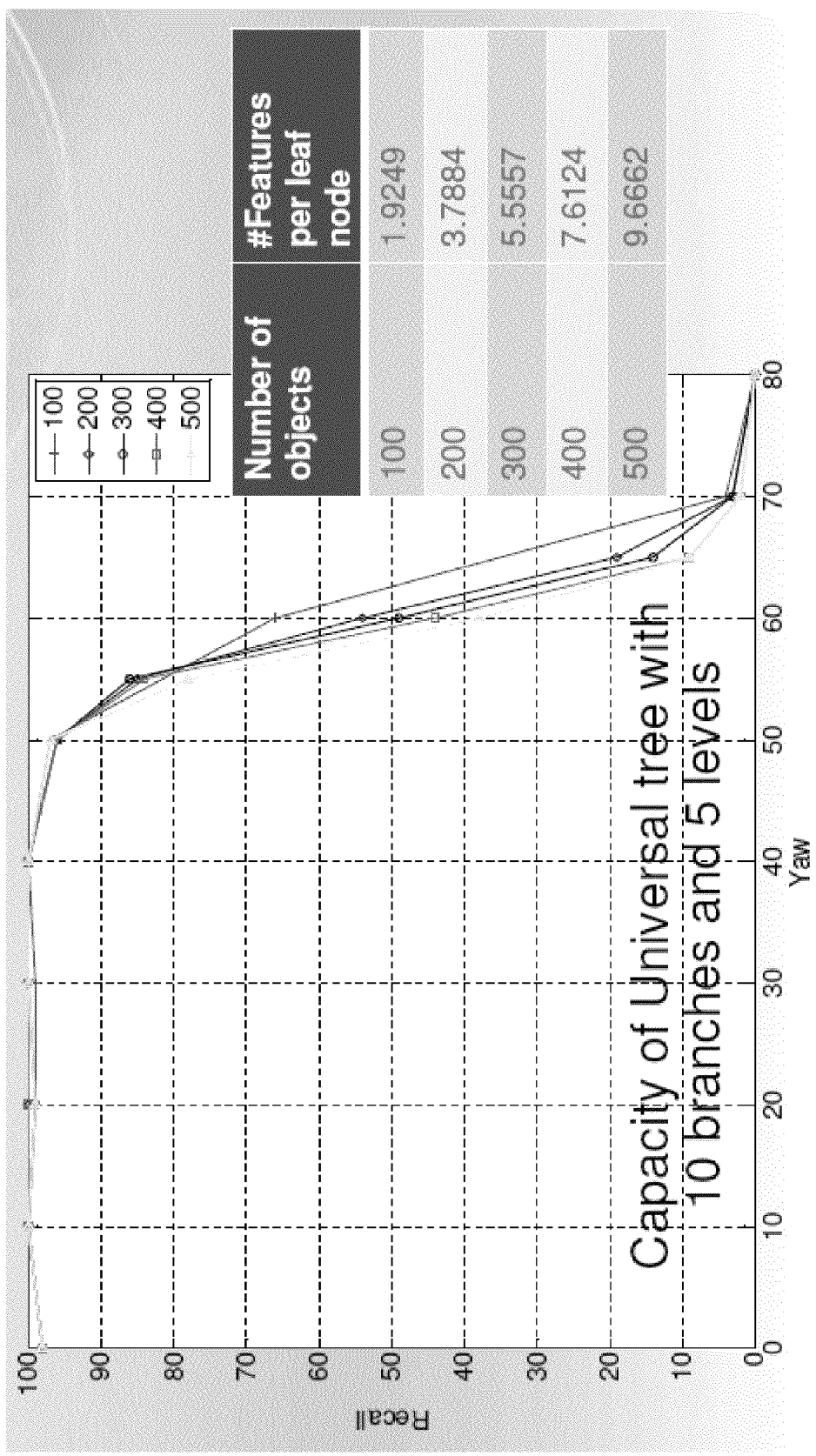
Figure 3C:
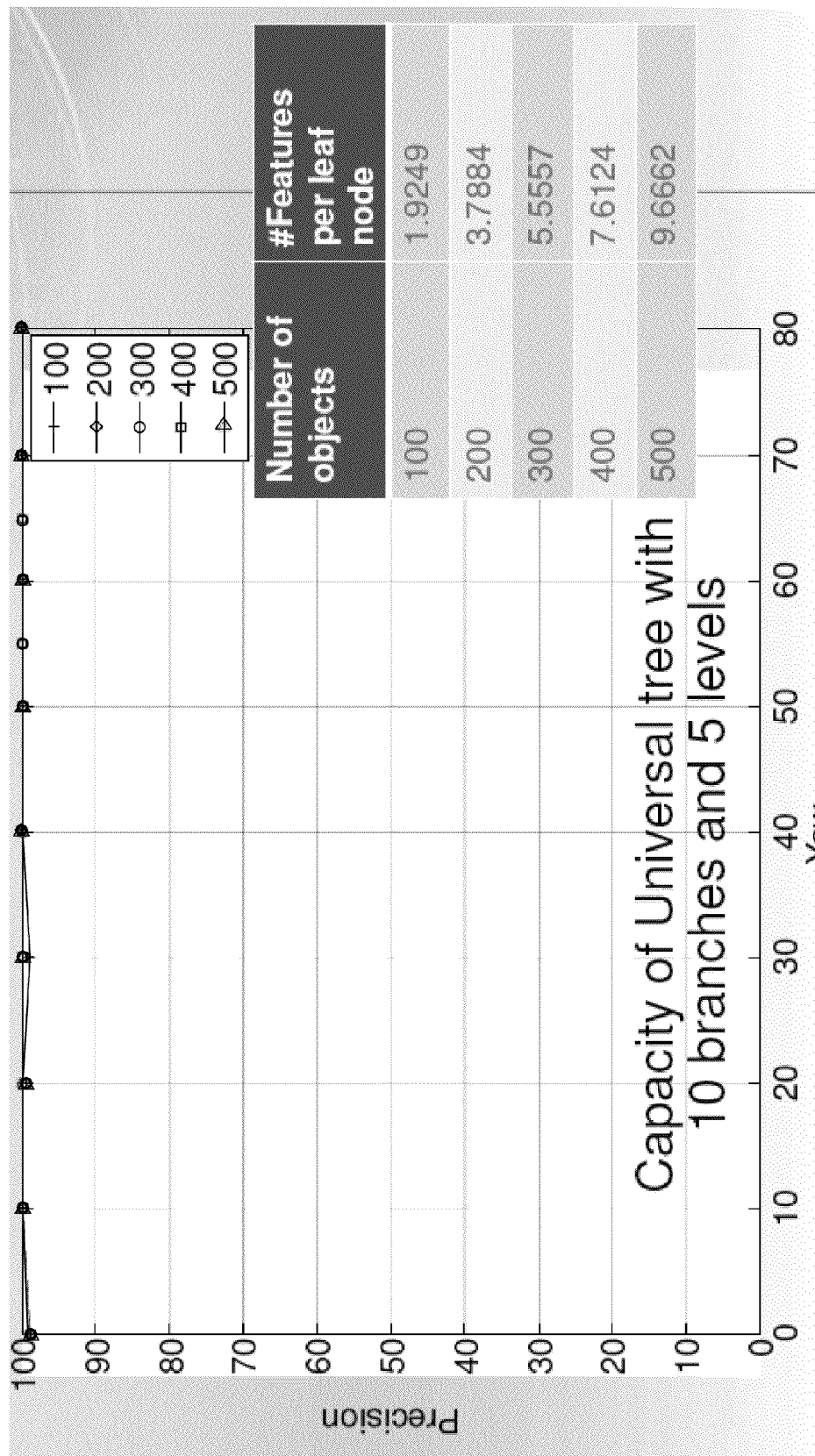
Figure 3D:
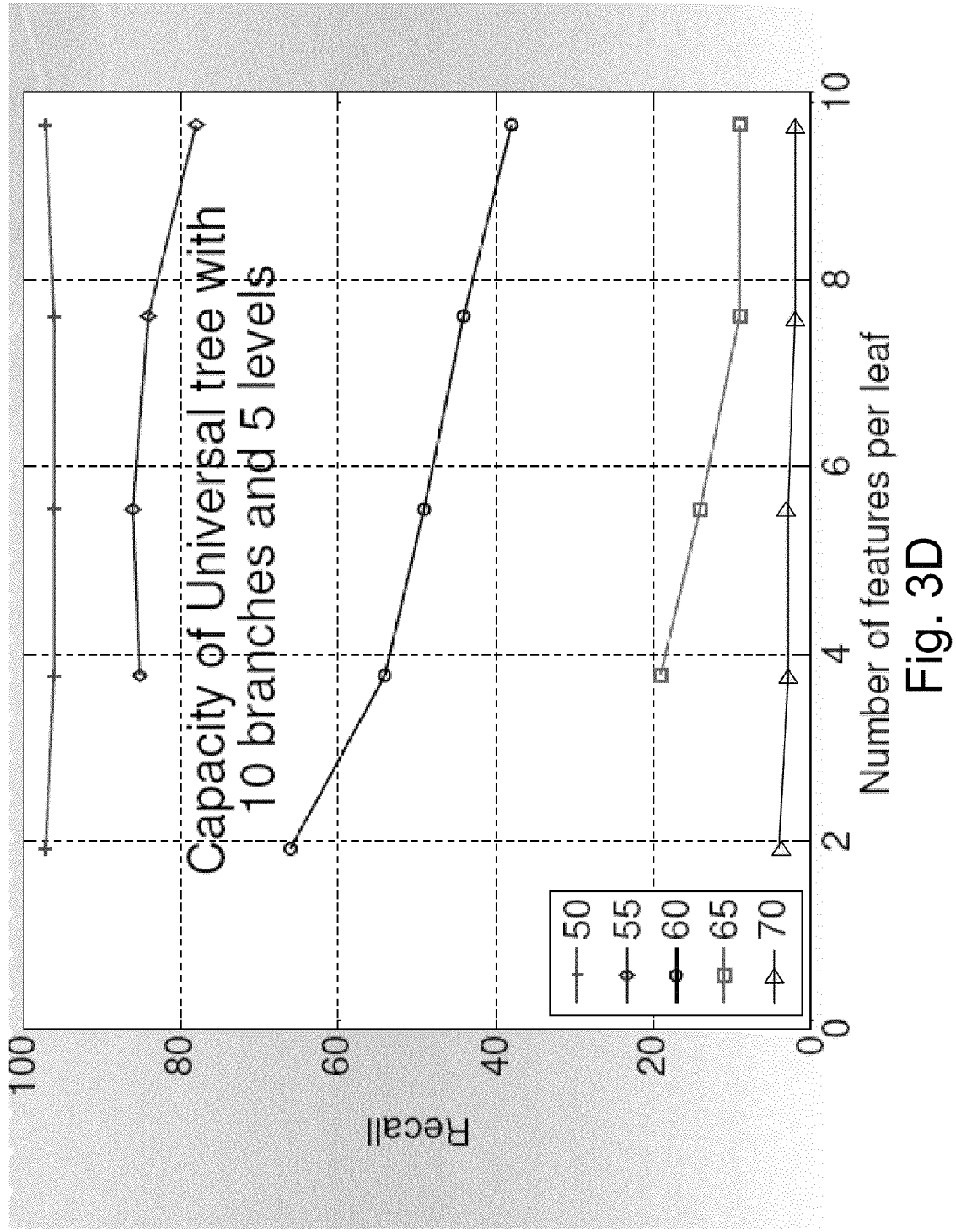

FIG. 3A illustrates the recognition results as a function of recall vs. yaw for a universal tree with 10 branches and 5 levels for different database sizes. FIG. 3B illustrates the pose estimation results as a function of recall vs. yaw for a universal tree with 10 branches and 5 levels for different database sizes. FIG. 3C illustrates the pose estimation results as a function of precision vs. yaw for a universal tree with 10 branches and 5 levels for different database sizes. As evident from the figures, the performance of the tree reduces (in terms of recall) as the number of objects in the database increases. This is also evident in FIG. 3D, which plots the recall as a function of number of features in the leaf node in the tree as a function of the yaw angle. These results suggest and re-iterate that the main factors affecting the performance of the tree for recognition are the tree structure itself and the objects previously added to the tree and therefore determining if and when to add a new object to the tree is important for retaining good object detection and retrieval performance.

Thus, the server 110 (or mobile device 130) automatically quantifies whether a target for inclusion in the object database 120 (or object database 120a) is a valid target image, i.e., good from a recognition perspective, and quantifies the health of the search structure in the object database 120 (or object database 120a) to determine if it is feasible to add more target images. The server 110 (or mobile device 130) may recommend or implement additional fall-back mechanisms in cases when it is determined that the health of the search structure would become worse on adding an object. By means of an example, the system may suggest creating a new structure to handle freshly added objects or may suggest changing the search structure to effectively handle new objects.

Figure 4:
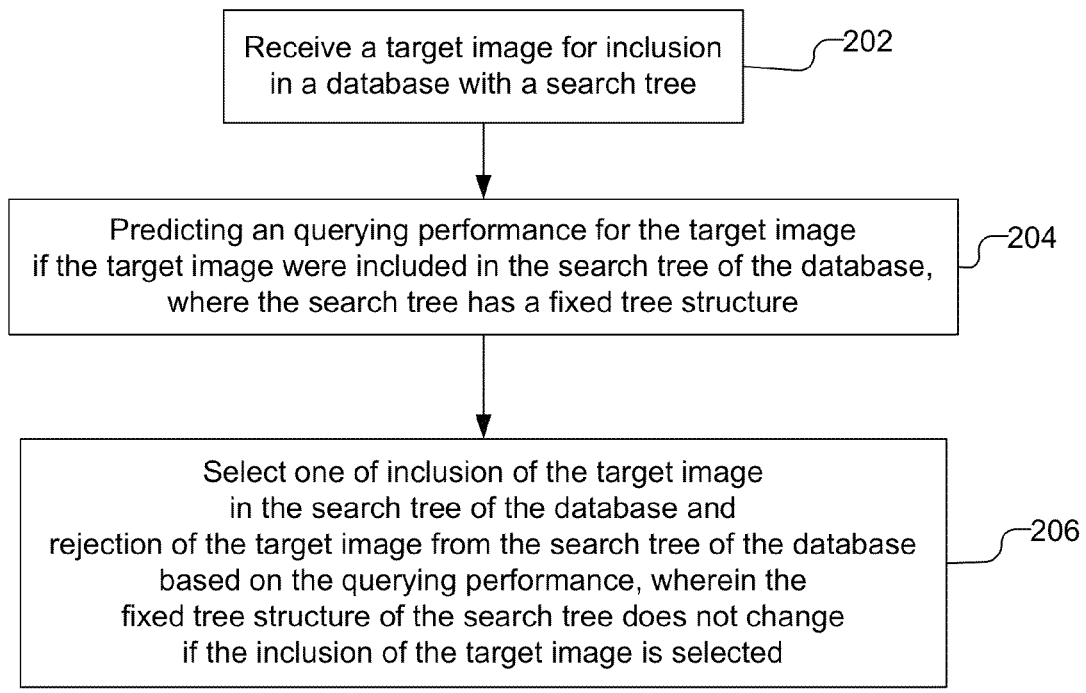
FIG. 4 is a flow chart of a method of determining whether to include a new target image in an object database.

FIG. 4 is a flow chart of a method of determining whether to include a new target image in an object database with a universal tree structure. The method may be performed by server 110 or mobile device 130 to include a new target image in object database 120 or local object database 120a. As illustrated, a target image is received for inclusion in a database with a search tree (202). A querying performance is predicted for the target image if the target image were included in the search tree of the database (204). The search tree has a fixed tree structure that does not change with the addition of new target images. Either inclusion or rejection of the target image from the search tree of the database is selected based on the querying performance (206), wherein the fixed tree structure of the search tree does not change if the inclusion of the target image is selected. The target image may be included in the search tree of the database, e.g., by adding extracted features from the target image or the entirety of the target image to the search tree.

Predicting the querying performance for the target image if the target image were included in the search tree of the database (204) may include determining whether the target image is a valid target image for object recognition. For example, a valid target image may be determined based on the target image having a number of extractable features suitable for object recognition that is greater than a threshold. Additionally or alternatively, predicting the querying performance for the target image if the target image were included in the search tree of the database may be based on estimating the performance of the search tree of the database with the inclusion of the target image during an object recognition task or a pose estimation task.

Figure 5:
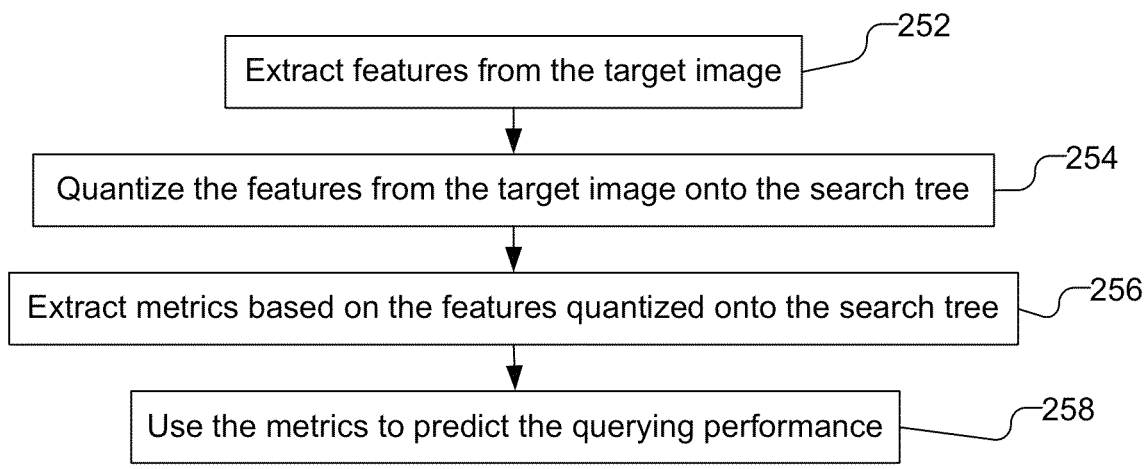
FIG. 5 is a flow chart illustrating a method of predicting the querying performance for the target image if the target image were included in the search tree of the database.

FIG. 5 is a flow chart illustrating a method of predicting the querying performance for the target image if the target image were included in the search tree of the database (204 from FIG. 4). As illustrated, features are extracted from the target image (252). Features may be extracted from the target image, e.g., using FAST, SIFT, SURF, or any other appropriate feature extraction technique. The extracted features from the target image are quantized onto the search tree (254). Metrics are extracted based on the features quantized onto the search tree (256). The metrics may then be used to predict the querying performance (258).

Extracting metrics may include determining at least one of a query score, entropy, probability that pose estimation will succeed based using the target image, and probability that a match with the target image will be correct. For example, for recognition, a query score may be determined as follows:

$$QueryScore(d) = \left\| \frac{[n_{q1}w_1 \quad n_{q2}w_2]}{\|[n_{q1}w_1 \quad n_{q2}w_2]\|} - \frac{[n_{d1}w_1 \quad n_{d2}w_2]}{\|[n_{d1}w_1 \quad n_{d2}w_2]\|} \right\| \quad \text{eq. 4}$$

where $n_{qi}$ is the number of features from the query image q that are quantized to the leaf node i. Similarly, the $n_{di}$ is the number of features from the database image d that are quantized to the leaf node i. The $w_i$ are Inverse document frequency (IDF) weights of the leaf node i and are defined as $w_i = \log(N/Ni)$ where N denotes the total number of images in the database and Ni represents the number of images with features in leaf node i. Note that the query score is a vector of length Nd where Nd is the number of objects in the database. Once the query score vector is computed, it is sorted in ascending order to obtained SortedQueryScore such that SortedQueryScore(1)≤SortedQueryScore(2)≤ . . . . The minimum value of the SortedQueryScore vector; a mean of the vector, variance of the vector, or median of the vector, etc. are computed to form metrics, such as:

$$\text{Metric}(1) = SortedQueryScore(1) \quad \text{eq. 5}$$

$$\text{Metric}(2) = \frac{1}{S-1} * \sum_{d \in \{2,\ldots,S\}} SortedQueryScore(d)$$

$$\text{Metric}(3) = \frac{1}{S-1} * \sum_{d \in \{2,\ldots,S\}} (SortedQueryScore(d) - \text{Metric}(2))^2$$

Metric(4) = Median{SortedQueryScore(2),

SortedQueryScore(3), ... , SortedQueryScore(S)}

Metric(5) = Metric(1) − Metric(2)

By means of an example, S=5. Additionally, entropy may be determined as the distribution of features in low/high weighted visual words. For example, entropy may be determined as follows:

Metric(6)=Entropy of $[n_{q1}w_1 n_{q2}w_2]$

Metric(7)=Entropy of $[n_{q1} n_{q2}]$      eq. 6

These entropy values can be used as additional metrics to estimate the capacity of the search structure for a given object to be added (q).

Additionally, the probability that a pose estimation succeeds given that an object is recognized may be based on the probability that RANdom SAmple Consensus (RANSAC) succeeds, which is determined by the percentage of inliers greater than a threshold, e.g.:

$$\text{Metric}(8) = \frac{\sum_i n_{qi}}{\sum_i n_{qi} \times n_{qi}} > \text{threshold.} \quad \text{eq. 7}$$

Alternatively, or additionally, the percentage of inliers may be defined as a metric as follows:

$$\text{Metric}(9) = \frac{\sum_i n_{qi} w_i}{\sum_i n_{qi} \times n_{qi} \times w_i \times w_i}. \quad \text{eq. 8}$$

The probability that a match is correct may be provided by:

$$\text{Metric}(10) = \prod_i \left(\frac{1}{n_{qi}}\right)^{n_{qi}}. \quad \text{eq. 9}$$

and additionally, or alternatively, may be provided by:

$$\text{Metric}(11) = \prod_i \left(\frac{1}{n_{qi} \times w_i}\right)^{n_{qi} \times w_i}. \quad \text{eq. 10}$$

One or more of these metrics, e.g., Metric(1) to Metric(11), may be used to determine the performance of the system and to determine if the given image is a GOOD, BAD or OK image to add to the database. Other or additional metrics may be used if desired.

Figure 6:
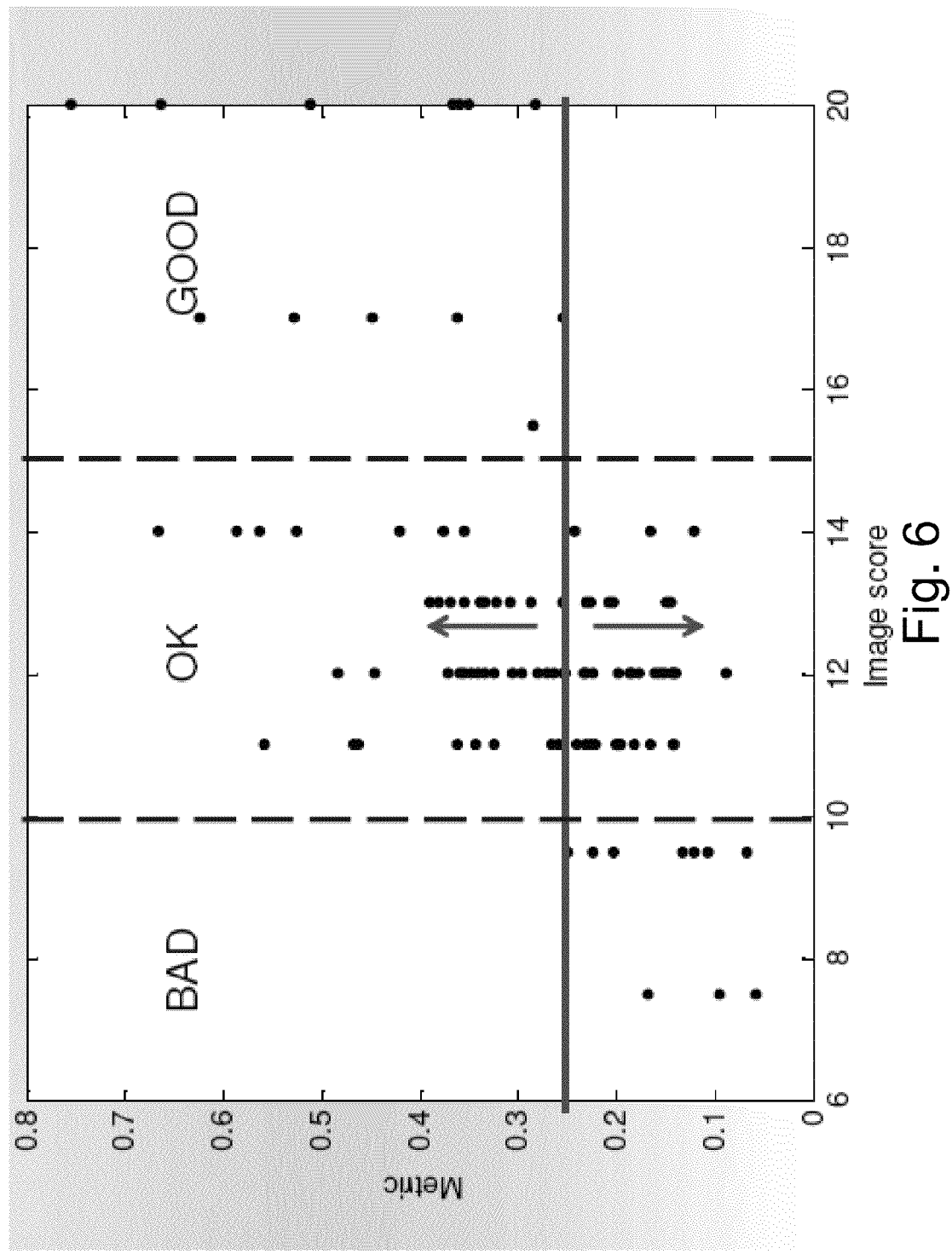
FIGS. 6-8 graphically illustrate metrics in classifying an image as GOOD and BAD for object recognition.
Figure 7:
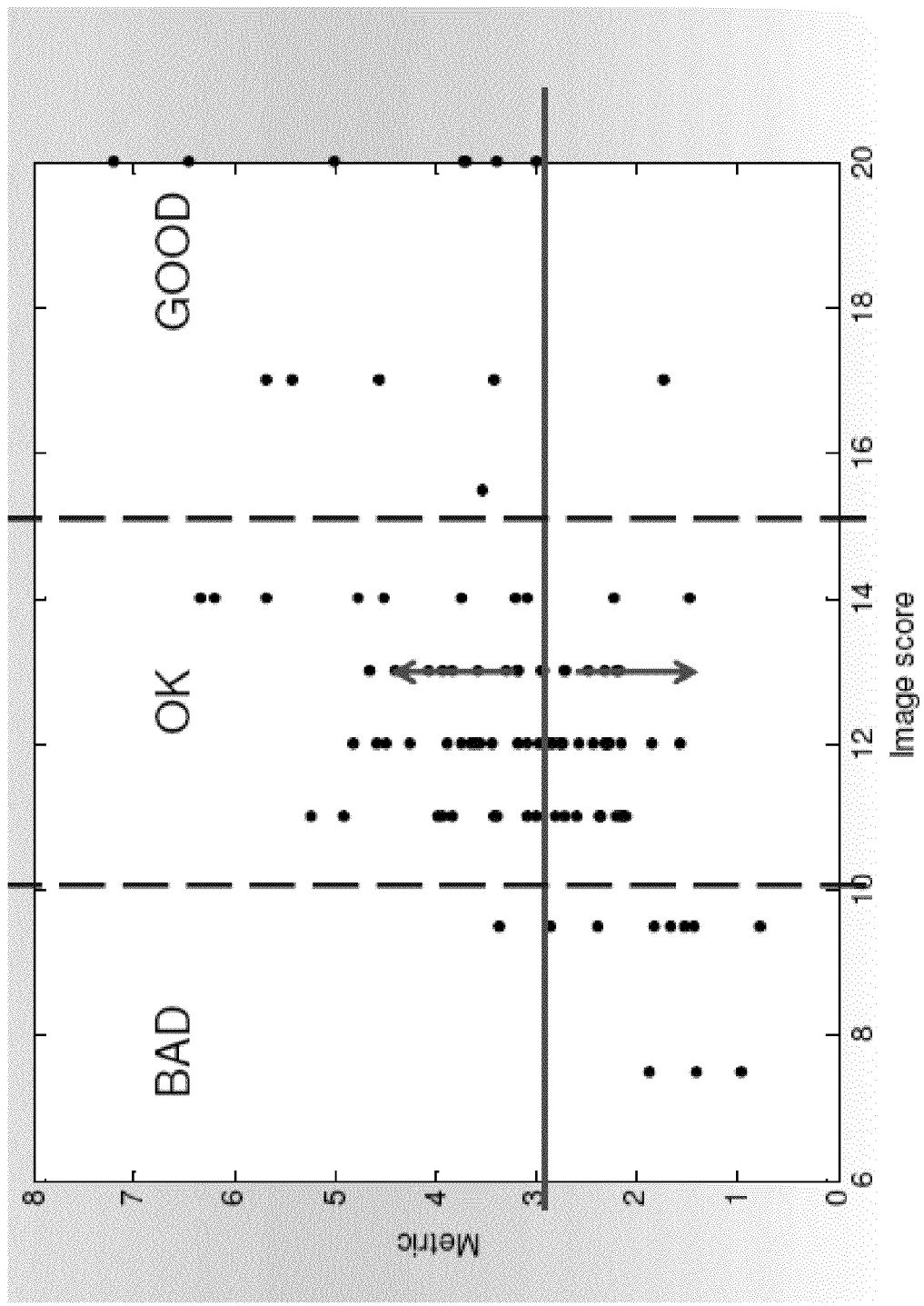
Figure 8:
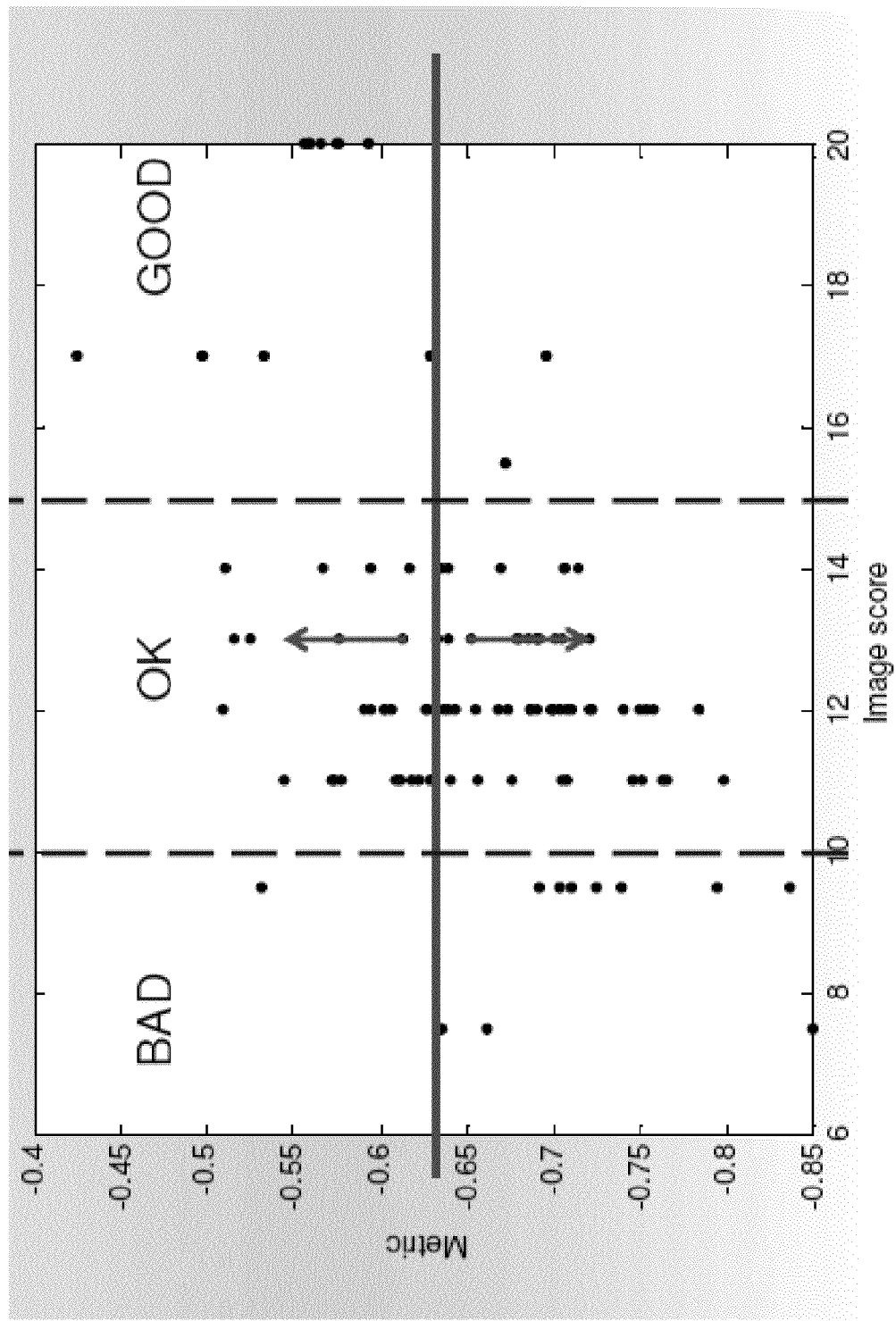

By way of example, to test the performance of these metrics, for each image in the dataset previously described, synthetic images were generated with variations in yaw from 0 to 95 degrees in steps of 5 degrees (a total of 20 manipulations). If "x" out of the 20 manipulations of the image are recognized, then the image receives a score equal to "x", and thus, 0≤x≤20. An object may be classified as GOOD if 15≤x≤20; OK if 11≤x≤14; and BAD if 1≤x≤10. Thus, the higher the score x, the better the image is for recognition tasks and therefore the better it is to add to the database. FIG. 6 graphically illustrates the performance of Metric(7) in equation 6. From FIG. 6, it can be seen that images with a BAD score, x≤10 also have Metric(7)≤0.25 and images with a GOOD score, x≥15 have a Metric(7)>0.25. Therefore, a simple classifier operating on the value of Metric(7), can classify images in GOOD and BAD categories with a with 100% accuracy. Similarly, FIG. 7 graphically illustrates the performance of Metric(6) in equation 6, and shows that a simple classifier comparing the value of Metric(6) to a threshold gives 92% accuracy in classifying between GOOD and BAD. FIG. 8 graphically illustrates the pose estimation success based on the percentage of inlier Metric(8) from equation 7, with 92% accuracy in classifying between GOOD and BAD, with a correlation coefficient of 0.47. A support vector machine (SVM) built on these features provides 85% accuracy on the test set to classify between GOOD and BAD classes (90% accuracy on training set).

An alternate method to study the performance of the metrics is to predict the querying performance via a regression analysis. For example, the image scores for all images in the training set may be arranged as a vector, e.g., X (N×1, N-number of training images). The metrics for all images are organized in the form of a matrix A (N×F, F-number of metrics). Coefficients are computed that minimize:

$$\|Aw-X\|^2. \qquad \text{eq. 11}$$

The error in estimation is computed over the test set. A regression built on the metrics provide a mean accuracy of prediction in 'x' to around 1.86 (~9.3 degrees yaw angle).

Thus, the metrics may be used to predict the querying performance of a target image to be included in a database (258) in FIG. 5. By way of example, the metrics may be analyzed separately such that if any one metric indicates that the predicted performance is BAD, the server may reject the target image. Alternatively, the values of one or more of the metrics may be combined and compared to a threshold (or more than one threshold) to determine if the querying performance of a target image is predicted to be, e.g., BAD, GOOK, or OK. For example, the values (e.g., normalized values) of one or more of the metrics may be combined as an average, weighted average, mean, median, or any other statistical combination, and the combined score compared to one or more thresholds. Based on the result, the target image may be selected for inclusion or rejection from the database. For example, if the predicted performance is BAD, i.e., greater than a threshold, the server may reject the new target image, add the new target image to a separate search tree, request a better target image for the object database, or raise a flag to handle the target image separately.

Figure 9:
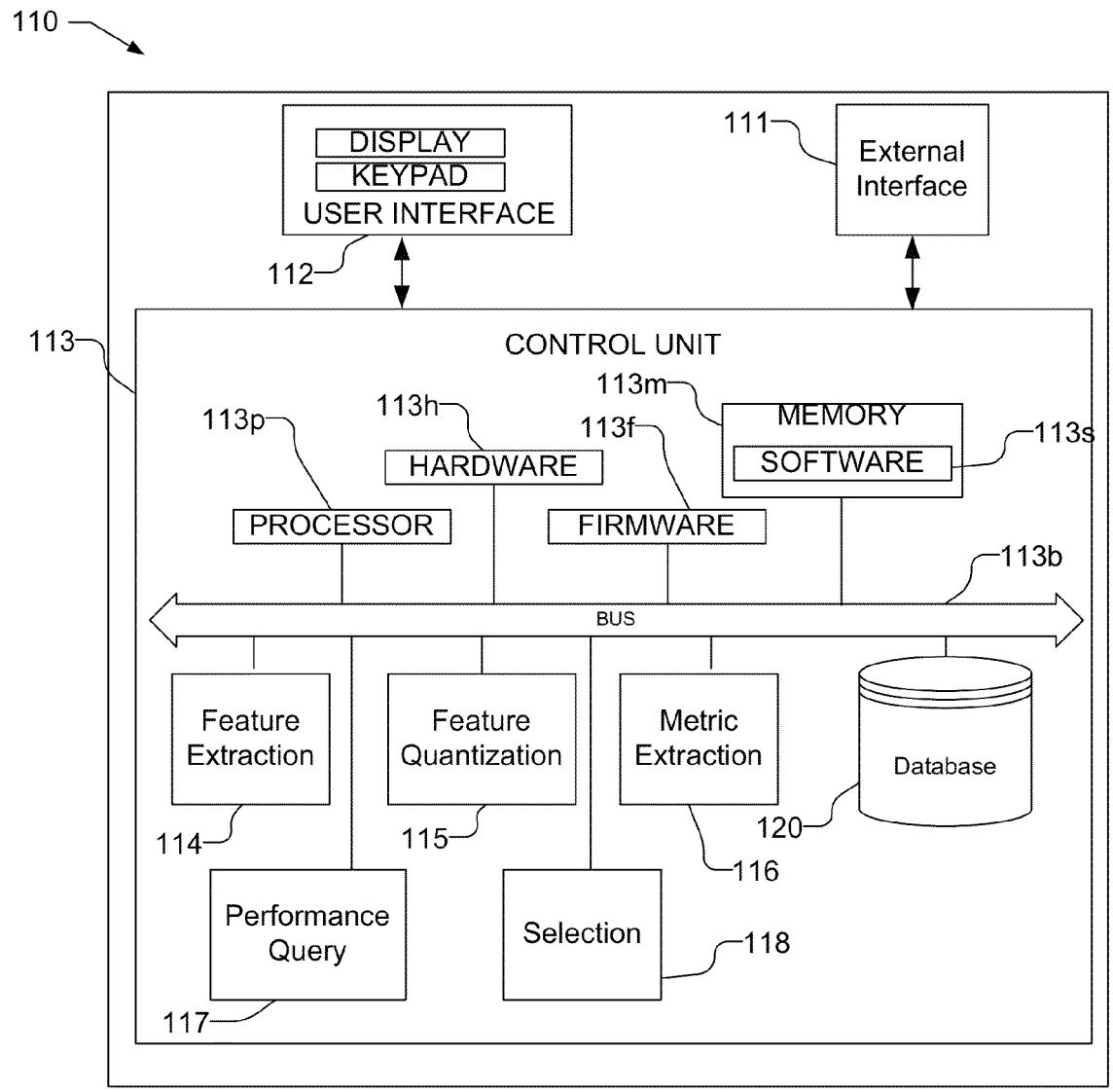
FIG. 9 is a block diagram of a server capable predicting a querying performance for a new target image if the target image were included in a universal search tree of the database.

FIG. 9 is a block diagram of a server 110 capable of predicting a querying performance for a new target image if the target image were included in a universal search tree of the database. The server 110 includes an external interface 111 that may be used to receive new target images, or data related to the target images such as extracted features, and may be used to communicate with mobile device 130 shown in FIG. 1. The server 110 may further include a user interface 112 that may include e.g., a display, as well as a keypad or other input device through which the user can input information into the server 110.

The external interface 111 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATS) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 110 also includes a control unit 113 that is connected to and communicates with the external interface 111. The control unit 113 accepts and processes the received target image data received by external interface 111. The control unit 113 may be provided by a bus 113b, processor 113p and associated memory 113m, hardware 113h, firmware 113f, and software 113s. The control unit 113 is further illustrated as including a feature extraction module 114 to extract features from a target image if the received target image data is not in the form of extracted features. The control unit 113 may further include a feature quantization module 115 that quantizes the features from the target image onto the search tree of the database 120, and a metric extraction module 116 to extract one or more metrics based on the features quantized onto the search tree. A performance querying module 117 is used to predict the querying performance if the target image were included in the search tree of the database, e.g., using the metrics. A selection module 118 is used to select inclusion or exclusion of the target image from the universal search tree of the database 120, where the target image is stored in the universal search tree in the database 120 without changing the search tree structure when inclusion is selected.

The various modules 114-118 are illustrated separately from processor 113p for clarity, but may be part of the processor 113p or implemented in the processor based on instructions in the software 113s which is run in the processor 113p. It will be understood as used herein that the processor 113p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 113h, firmware 113f, software 113s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 113m and executed by the processor 113p. Memory 113m may be implemented within or external to the processor 113p. If implemented in firmware and/or software, the functions may be stored as one or more instructions or code on a storage medium that is computer-readable, wherein the storage medium does not include transitory propagating signals. Examples include storage media encoded with a data structure and storage media encoded with a computer program. Storage media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the apparatus may include means for receiving a target image for inclusion in a database with a search tree, which may be, e.g., the external interface 111. Means for predicting a querying performance for the target image if the target image were included in the search tree of the database, wherein the search tree has a fixed tree structure that does not change when adding new target images may be, e.g., the feature extraction module 114, feature quantization module 115, metric extraction module 116, and performance query module 117, all or any of which may be implemented in hardware 113$h$, firmware 113$f$, or processor 113$p$ performing instructions received from software 113$s$. Means for selecting one of inclusion of the target image in the search tree of the database and rejection of the target image from the search tree of the database based on the querying performance, wherein the fixed tree structure of the search tree does not change if the inclusion of the target image is selected may be, e.g., the selection module 118, which may be implemented in hardware 113$h$, firmware 113$f$, or processor 113$p$ performing instructions received from software 113$s$. The means for predicting the querying performance for the target image if the target image were included in the search tree of the database may include means for extracting features from the target image, which may be, e.g., the feature extraction module 114; means for quantizing the features from the target image onto the search tree, which may be, e.g., feature quantization module 115; means for extracting metrics based on the features quantized onto the search tree, which may be, e.g., metric extraction module 116; and means for using the metrics to predict the querying performance, which may be, e.g., performance query module 117, all or any of which may be implemented in hardware 113$h$, firmware 113$f$, or processor 113$p$ performing instructions received from software 113$s$.

Figure 10:
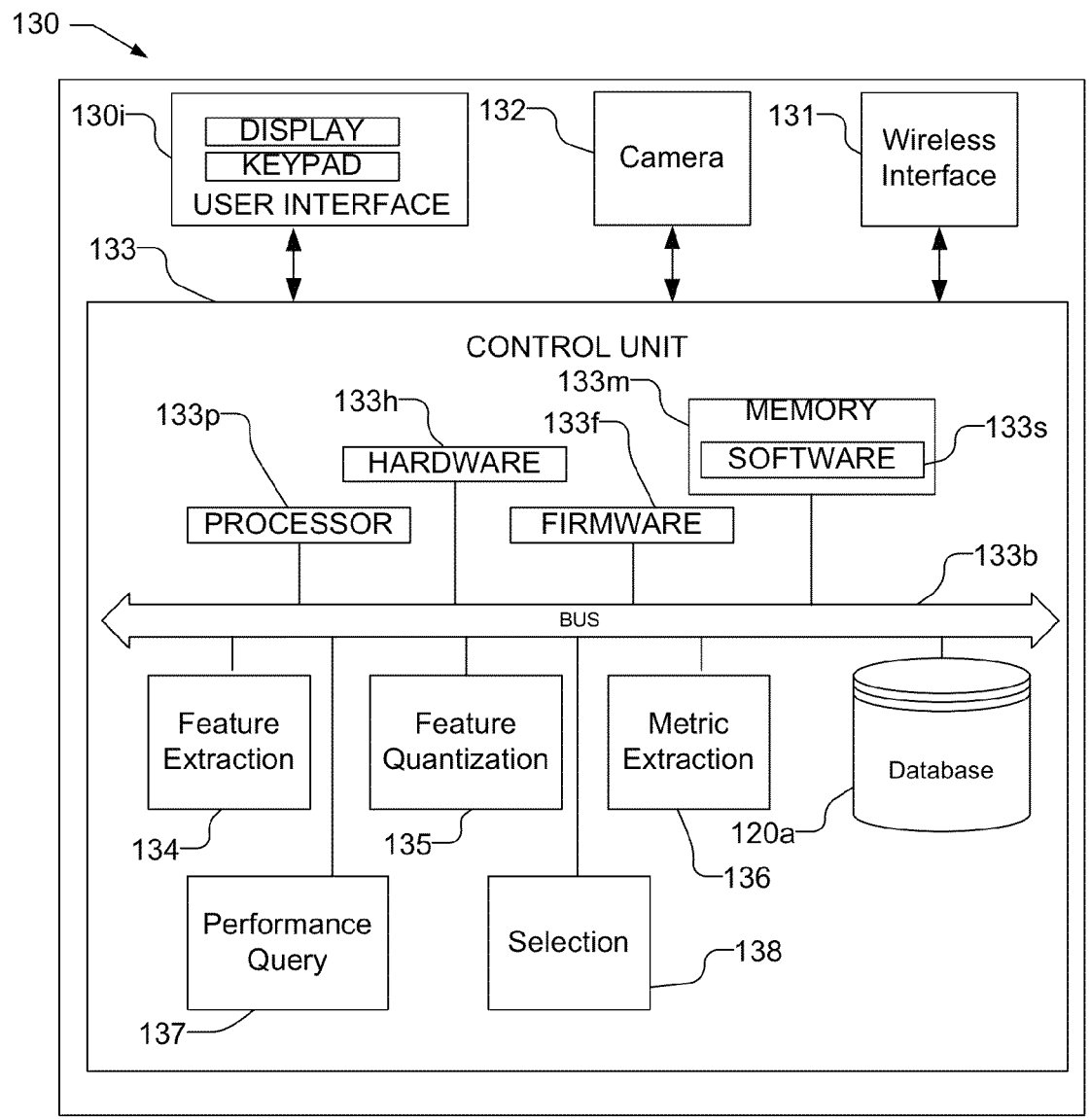
FIG. 10 is a block diagram of a mobile device capable predicting a querying performance for a new target image if the target image were included in a universal search tree of the database in a manner similar to server.

FIG. 10 is a block diagram of a mobile device 130 capable predicting a querying performance for a new target image if the target image were included in a universal search tree of the database in a manner similar to server 110 discussed above. If desired, mobile device 130 may perform only part of the process while server 110 performs the remainder of the process, e.g., the mobile device 130 may analyze a new target image and predict a querying performance, while server 110 may select the new target image for inclusion or exclusion to the database based on the results. As illustrated, the mobile device 130 includes an interface for receiving a target image for inclusion in a database with a search tree, which may be the interface between the camera 132 and control unit 133 or a wireless interface 131 that may be used to communicate with server 110 to provide a target image, target image data, various results of the analysis of the target image data as well as receive data from the server 110, e.g., to be stored in local database 120$a$. The mobile device 130 may further include a user interface 130$i$ that may include e.g., a display, as well as a keypad or other input device through which the user can input information into the mobile device 130.

The wireless interface 131 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 130 also includes a control unit 133 that is connected to and communicates with the wireless interface 131 and camera 132. The control unit 133 accepts and processes the received target image data, e.g., received from the camera 132 or wireless interface 131. The control unit 133 may be provided by a bus 133$b$, processor 133$p$ and associated memory 133$m$, hardware 133$h$, firmware 133$f$, and software 133$s$. The control unit 133 is further illustrated as including a feature extraction module 134 to extract features from a target image if the received target image data is not in the form of extracted features. The control unit 133 may further include a feature quantization module 135 that quantizes the features from the target image onto the search tree of the database 120, and a metric extraction module 136 to extract one or more metrics based on the features quantized onto the search tree. A performance querying module 137 is used to predict the querying performance if the target image were included in the search tree of the database, e.g., using the metrics. A selection module 138 is used to determine select inclusion or exclusion of the target image from the universal search tree of the database 120$a$, where the target image is stored in the universal search tree in the database 120$a$ without changing the search tree structure when inclusion is selected. If desired, the target image may be transmitted to server 110 via wireless interface 131 and stored in database 120.

The various modules 134-138 are illustrated separately from processor 133$p$ for clarity, but may be part of the processor 133$p$ or implemented in the processor based on instructions in the software 133$s$ which is run in the processor 133$p$. It will be understood as used herein that the processor 133$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 133$h$, firmware 133$f$, software 133$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 133$m$ and executed by the processor 133$p$. Memory 133$m$ may be implemented within or external to the processor 133$p$. If implemented in firmware and/or software, the functions may be stored as one or more instructions or code on a storage medium that is computer-readable, wherein the storage medium does not include transitory propagating signals. Examples include storage media encoded with a data structure and storage media encoded with a computer program. Storage media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the apparatus may include means for receiving a target image for inclusion in a database with a search tree, which may be, e.g., the camera 132 or the wireless interface 131. Means for predicting a querying performance for the target image if the target image were included in the search tree of the database, wherein the search tree has a fixed tree structure that does not change when adding new target images may be, e.g., the feature extraction module 134, feature quantization module 135, metric extraction module 136, and performance query module 137, all or any of which may be implemented in hardware 133$h$, firmware 133$f$, or processor 133$p$ performing instructions received from software 133$s$. Means for selecting one of inclusion of the target image in the search tree of the database and rejection of the target image from the search tree of the database based on the querying performance, wherein the fixed tree structure of the search tree does not change if the inclusion of the target image is selected may be, e.g., the selection module 138, which may be implemented in hardware 133$h$, firmware 133$f$, or processor 133$p$ performing instructions received from software 133$s$. The means for predicting the querying performance for the target image if the target image were included in the search tree of the database may include means for extracting features from the target image, which may be, e.g., the feature extraction module 134; means for quantizing the features from the target image onto the search tree, which may be, e.g., feature quantization module 135; means for extracting metrics based on the features quantized onto the search tree, which may be, e.g., metric extraction module 136; and means for using the metrics to predict the querying performance, which may be, e.g., performance query module 137, all or any of which may be implemented in hardware 133$h$, firmware 133$f$, or processor 133$p$ performing instructions received from software 133$s$.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of adding images to a database with a search tree, the method comprising:
    receiving a target image for inclusion in the database with the search tree;
    predicting a querying performance for the target image if the target image were included in the search tree of the database, wherein the search tree has a fixed tree structure that does not change when adding new target images, wherein the querying performance for the target image if the target image were included in the search tree of the database is an estimate of an object recognition performance of the search tree of the database with the inclusion of the target image in the search tree of the database; and
    selecting one of inclusion of the target image in the search tree of the database and rejection of the target image from the search tree of the database based on the querying performance that was predicted for the target image if the target image were included in the search tree of the database, wherein the fixed tree structure of the search tree does not change if the inclusion of the target image is selected.

2. The method of claim 1, wherein predicting the querying performance for the target image if the target image were included in the search tree of the database comprises determining whether the target image is a valid target image for object recognition.

3. The method of claim 2, wherein the valid target image includes a number of extractable features suitable for object recognition that is greater than a threshold.

4. The method of claim 1, wherein predicting the querying performance for the target image if the target image were included in the search tree of the database further comprises estimating the performance of the search tree of the database with the inclusion of the target image during pose estimation.

5. The method of claim 1, wherein predicting the querying performance for the target image if the target image were included in the search tree of the database comprises:
    extracting features from the target image;
    quantizing the features from the target image onto the search tree;

extracting metrics based on the features quantized onto the search tree; and using the metrics to predict the querying performance.

6. The method of claim 5, wherein extracting metrics comprises determining at least one of a query score, entropy, probability that a pose estimation will succeed based using the target image, and probability that a match with the target image will be correct.

7. The method of claim 5, wherein using the metrics to predict the querying performance comprises performing a regression analysis of the metrics.

8. The method of claim 1, further comprising adding the target image to a different search tree when rejection of the target image from the search tree of the database is selected based on the querying performance that was predicted for the target image if the target image were included in the search tree of the database.

9. An apparatus for adding images to a database with a search tree, the apparatus comprising:
an interface for receiving a target image for inclusion in the database with the search tree; and
a processor coupled to the interface for receiving the target image, the processor configured to receive the target image, predict a querying performance for the target image if the target image were included in the search tree of the database, wherein the search tree has a fixed tree structure that does not change when adding new target images, wherein the querying performance for the target image if the target image were included in the search tree of the database is an estimate of an object recognition performance of the search tree of the database with the inclusion of the target image in the search tree of the database, and select one of inclusion of the target image in the search tree of the database and rejection of the target image from the search tree of the database based on the querying performance that was predicted for the target image if the target image were included in the search tree of the database.

10. The apparatus of claim 9, wherein the processor is configured to predict the querying performance for the target image if the target image were included in the search tree of the database by being configured to determine whether the target image is a valid target image for object recognition.

11. The apparatus of claim 10, wherein the valid target image includes a number of extractable features suitable for object recognition that is greater than a threshold.

12. The apparatus of claim 9, wherein the processor is configured to predict the querying performance for the target image if the target image were included in the search tree of the database by being further configured to estimate the performance of the search tree of the database with the inclusion of the target image during pose estimation.

13. The apparatus of claim 9, wherein the processor is configured to predict the querying performance for the target image if the target image were included in the search tree of the database by being configured to:
extract features from the target image;
quantize the features from the target image onto the search tree;
extract metrics based on the features quantized onto the search tree; and
use the metrics to predict the querying performance.

14. The apparatus of claim 13, wherein the processor is configured to extract metrics by being configured to determine at least one of a query score, entropy;
probability that a pose estimation will succeed based using the target image; and
probability that a match with the target image will be correct.

15. The apparatus of claim 13, wherein the processor is configured to use the metrics to predict the querying performance by being configured to perform a regression analysis of the metrics.

16. The apparatus of claim 9, wherein the interface for receiving the target image for inclusion in the database with the search tree comprises an interface between a camera and the processor.

17. An apparatus for adding images to a database with a search tree, the apparatus comprising:
means for receiving a target image for inclusion in the database with the search tree;
means for predicting a querying performance for the target image if the target image were included in the search tree of the database, wherein the search tree has a fixed tree structure that does not change when adding new target images, wherein the querying performance for the target image if the target image were included in the search tree of the database is an estimate of an object recognition performance of the search tree of the database with the inclusion of the target image in the search tree of the database; and
means for selecting one of inclusion of the target image in the search tree of the database and rejection of the target image from the search tree of the database based on the querying performance that was predicted for the target image if the target image were included in the search tree of the database, wherein the fixed tree structure of the search tree does not change if the inclusion of the target image is selected.

18. The apparatus of claim 17, wherein the means for predicting the querying performance for the target image if the target image were included in the search tree of the database determines whether the target image is a valid target image for object recognition.

19. The apparatus of claim 18 wherein the valid target image includes a number of extractable features suitable for object recognition that is greater than a threshold.

20. The apparatus of claim 17, wherein the means for predicting the querying performance for the target image if the target image were included in the search tree of the database estimates a performance of the search tree of the database with the inclusion of the target image during pose estimation.

21. The apparatus of claim 17, wherein the means for predicting the querying performance for the target image if the target image were included in the search tree of the database comprises:
means for extracting features from the target image;
means for quantizing the features from the target image onto the search tree;
means for extracting metrics based on the features quantized onto the search tree; and
means for using the metrics to predict the querying performance.

22. The apparatus of claim 21, wherein the means for extracting metrics determines at least one of a query score, entropy, probability that a pose estimation will succeed based using the target image, and probability that a match with the target image will be correct.

23. The apparatus of claim 21, wherein the means for using the metrics to predict the querying performance performs a regression analysis of the metrics.

24. A storage medium including program code stored thereon for adding images to a database with a search tree, the storage medium comprising:
- program code to receive a target image for inclusion in the database with the search tree;
- program code to predict a querying performance for the target image if the target image were included in the search tree of the database, wherein the search tree has a fixed tree structure that does not change when adding new target images, wherein the querying performance for the target image if the target image were included in the search tree of the database is an estimate of an object recognition performance of the search tree of the database with the inclusion of the target image in the search tree of the database; and
- program code to select one of inclusion of the target image in the search tree of the database and rejection of the target image from the search tree of the database based on the querying performance that was predicted for the target image if the target image were included in the search tree of the database, wherein the fixed tree structure of the search tree does not change if the inclusion of the target image is selected.

25. The storage medium of claim 24, wherein the program code to predict the querying performance for the target image if the target image were included in the search tree of the database comprises:
- program code to extract features from the target image;
- program code to quantize the features from the target image onto the search tree;
- program code to extract metrics based on the features quantized onto the search tree; and
- program code to use the metrics to predict the querying performance.

26. The storage medium of claim 25, wherein the program code to extract metrics comprises program code to determine at least one of a query score, entropy, probability that a pose estimation will succeed based using the target image, and probability that a match with the target image will be correct.

27. The storage medium of claim 25, wherein the program code to use the metrics to predict the querying performance comprises program code to perform a regression analysis of the metrics.

* * * * *